(12) United States Patent
Ekstrom et al.

(10) Patent No.: US 9,718,028 B2
(45) Date of Patent: Aug. 1, 2017

(54) DISTRIBUTION PLATE FOR CROSSFLOW FILTRATION CASSETTES

(71) Applicant: GE HEALTHCARE BIO-SCIENCES AB, Uppsala (SE)

(72) Inventors: Karl Ekstrom, Uppsala (SE); Klaus Gebauer, Uppsala (SE); Hakan Lundstrom, Uppsala (SE); Patrik Akerstrom, Uppsala (SE)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 14/359,328

(22) PCT Filed: Dec. 17, 2012

(86) PCT No.: PCT/SE2012/051403
§ 371 (c)(1),
(2) Date: May 20, 2014

(87) PCT Pub. No.: WO2013/095268
PCT Pub. Date: Jun. 27, 2013

(65) Prior Publication Data
US 2014/0305860 A1    Oct. 16, 2014

(30) Foreign Application Priority Data

Dec. 20, 2011    (SE) ........................................ 1151222

(51) Int. Cl.
*B01D 63/08*    (2006.01)

(52) U.S. Cl.
CPC ........... *B01D 63/08* (2013.01); *B01D 63/081* (2013.01); *B01D 63/082* (2013.01);
(Continued)

(58) Field of Classification Search
CPC .......... B01D 2313/10; B01D 2313/105; B01D 2313/12; B01D 2313/125; B01D 2313/13;
(Continued)

(56) References Cited

U.S. PATENT DOCUMENTS 5,147,542 A    9/1992    Proulx
5,176,828 A    1/1993    Proulx
(Continued)

FOREIGN PATENT DOCUMENTS

DE    102006009804         9/2007
EP         0498211 B1    11/1996
(Continued)

OTHER PUBLICATIONS

Office Action (translation) issued in corresponding CN Patent Application 201280063162.9 (Aug. 4, 2015).

*Primary Examiner* — John Kim

(57) ABSTRACT

The invention discloses a distribution plate for supplying crossflow filtration cassettes, which comprises a surface, two opposite end walls, two opposite side walls, a feed channel in fluid communication with a feed inlet port and with a plurality of feed apertures; a retentate channel in fluid communication with a retentate outlet port, and with a plurality of retentate apertures; and a permeate channel in fluid communication with two permeate outlet ports and with a plurality of permeate apertures;
wherein the feed channel, the retentate channel and the permeate channel extend in a direction essentially parallel with one or both side walls;
wherein the feed apertures are grouped at a first area on the surface, the retentate apertures are grouped at a second area on the surface;
wherein the permeate apertures are located at the first and/or the second area; and
(Continued)

wherein a plurality of permeate connector channels extend inside the plate from at least one region of the permeate channel, adjacent the permeate outlet ports and the permeate connector channels provide fluidic communication between the permeate apertures and the permeate channel.

11 Claims, 5 Drawing Sheets

(52) U.S. Cl.
CPC .... *B01D 2313/10* (2013.01); *B01D 2313/105* (2013.01); *B01D 2313/12* (2013.01); *B01D 2313/125* (2013.01); *B01D 2313/13* (2013.01); *B01D 2313/21* (2013.01); *B01D 2313/54* (2013.01); *B01D 2317/04* (2013.01); *Y10T 408/03* (2015.01)

(58) Field of Classification Search
CPC ............ B01D 2313/21; B01D 2313/54; B01D 2317/04; B01D 63/08; B01D 63/081; B01D 63/082; Y10T 408/03
See application file for complete search history.

(56) References Cited

U.S. PATENT DOCUMENTS

| | | | |
|---|---|---|---|
| 6,506,300 | B2 | 1/2003 | Kuss et al. |
| 7,635,426 | B2 | 12/2009 | Weinstein et al. |
| 8,701,704 | B2 | 4/2014 | Cirou et al. |
| 2006/0163141 | A1 | 7/2006 | Weinstein et al. |
| 2012/0174996 | A1* | 7/2012 | Cirou ................ B01D 61/20 137/544 |

FOREIGN PATENT DOCUMENTS

| | | |
|---|---|---|
| EP | 1258282 A2 | 11/2002 |
| EP | 1560638 A1 | 8/2005 |
| EP | 2388062 | 11/2011 |
| GB | 2348381 | 10/2000 |
| JP | 06-114213 A | 4/1994 |
| JP | 2003-024750 A | 1/2003 |
| JP | 2006505406 A | 2/2006 |
| JP | 2011-240333 A | 12/2011 |
| WO | 2004043577 A1 | 5/2004 |

* cited by examiner

DISTRIBUTION PLATE FOR CROSSFLOW FILTRATION CASSETTES

CROSS-REFERENCE TO RELATED APPLICATIONS

This application is a filing under 35 U.S.C. 371 of international application number PCT/SE2012/051403, filed Dec. 17, 2012, published on Jun. 27, 2013 as WO 2013/095268, which claims priority to application number 1151222-5 filed in Sweden on Dec. 20, 2011.

TECHNICAL FIELD OF THE INVENTION

The present invention relates to filtration apparatus and in particular to distribution plates and housing for crossflow filtration cassettes. The invention also relates to a method of manufacturing a distribution plate for crossflow filtration cassettes.

BACKGROUND OF THE INVENTION

Microfiltration and ultrafiltration equipment is required for many applications including the concentration, fractionation and buffer exchange of protein solutions, the depyrogenation of water and intravenous solutions, the desalting of biological and the removal of macromolecules and colloids. A well-known type of such equipment employs a filtration cassette comprising a stacked array of filtration membranes separated by flow accommodating screens and retained between demountable plates. At least one of these demountable plates is a distributor plate and contains a channel system for supply of feed to and collection of retentate and permeate from the cassette. The channel system is in fluidic communication with the cassette via apertures on the plate surface, aligned in registry with corresponding apertures on the cassette. When such equipment is used in the manufacture of biopharmaceuticals it is critical that it is easy to sanitise, with no deadlegs and with pore-free polished flow-path surfaces. Further, it is essential that the entire flow-path system can be drained between runs without leaving pools of remaining liquid in the equipment. Full drainage improves product recovery and also allows for total area utilisation in an air integrity test.

GB2348381A describes a distributor plate for filter cassettes with a channel system that branches out from two end surfaces of the plate. This plate has horizontal channels which can give rise to incomplete draining. Hence, there remains a need for distributor plates with improved draining properties.

SUMMARY OF THE INVENTION

One aspect of the invention is to provide a sanitary distributor plate for supplying filtration cassettes with good draining and deaeration properties. This is achieved with a distributor plate as defined in claim 1. One advantage of this plate is that it is easy to clean and to drain and deareate. A further advantage is that it is easy to manufacture and that it can withstand high clamping pressures.

A second aspect of the invention is to provide a housing for filtration cassettes, which is sanitary and provides good draining and deaeration properties. This is achieved with a housing as defined in claim 14.

A third aspect of the invention is to provide a stack of at least two housings for filtration cassettes, which is sanitary and provides good draining and deaeration properties. This is achieved with a stack as defined in claim 18. One advantage of this is that the entire stack is easy to clean and to drain and deaerate.

A fourth aspect is to provide a convenient method of manufacturing a sanitary distributor plate for supplying filtration cassettes. This is achieved with a method as defined in claim 19. One advantage of the method is that it allows the manufacture of the plate from a single plate body piece.

Further suitable embodiments of the invention are described in the depending claims.

DETAILED DESCRIPTION OF EMBODIMENTS

Figure 1:
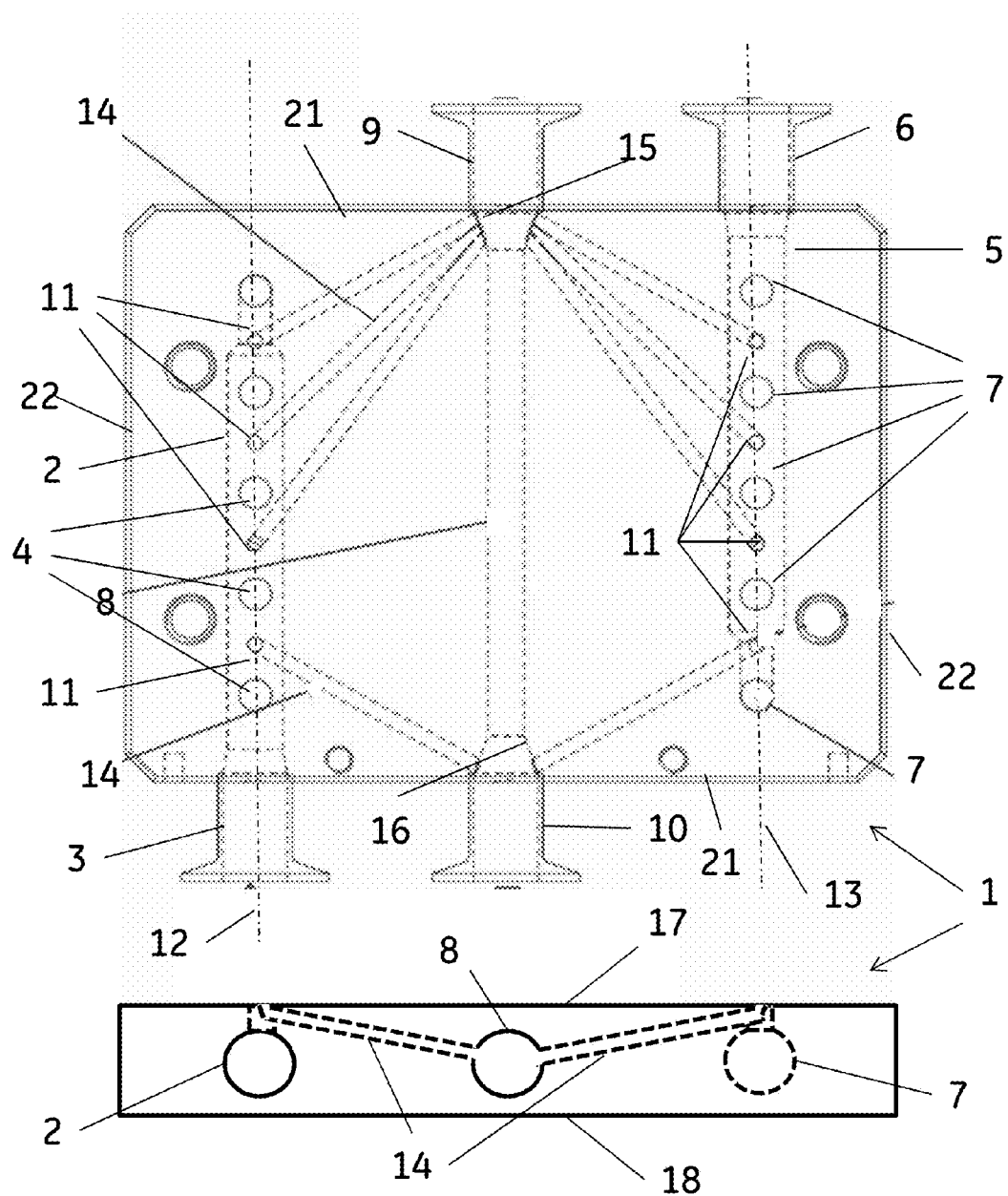
FIG. 1 shows a distribution plate according to the invention.
Figure 2:
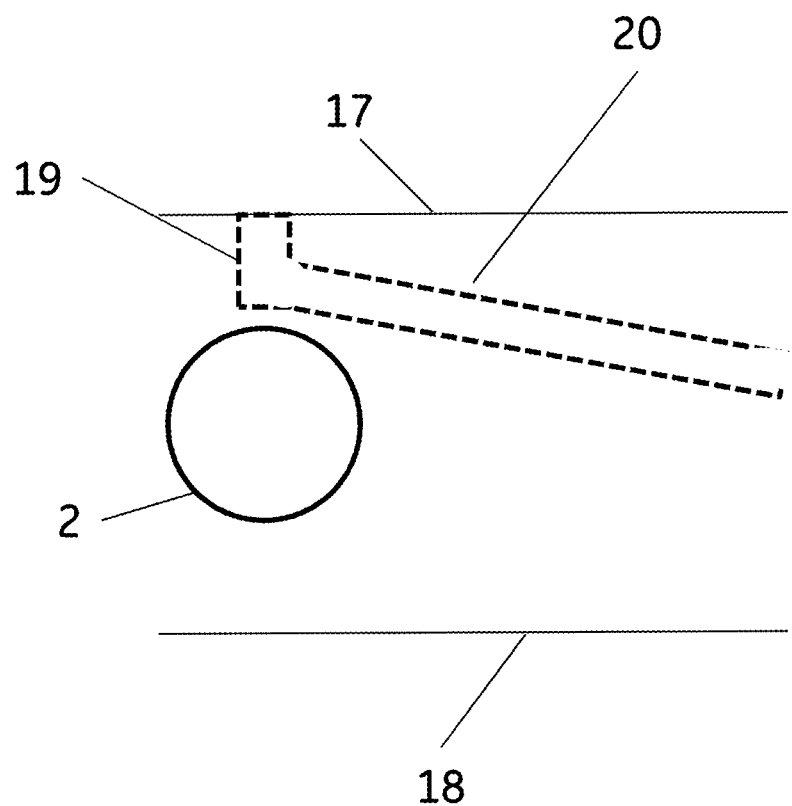
FIG. 2 shows an enlargement of the permeate apertures according to one embodiment of the invention.

In a first aspect illustrated by FIGS. 1-2, the present invention discloses a distribution plate 1 for supplying crossflow filtration cassettes with fluids. The distribution plate comprises a surface 17; two opposite end walls 21; two opposite side walls 22; a feed channel 2 which is in fluid communication with a feed inlet port 3 and with a plurality of feed apertures 4 which open into the surface; a retentate channel 5 in fluid communication with a retentate outlet port 6; and with a plurality of retentate apertures 7 which open into the surface; and a permeate channel 8 in fluid communication with two permeate outlet ports 9,10 and with a plurality of permeate apertures 11 which open into the surface. The feed channel, the retentate channel and the permeate channel extend in a direction essentially parallel with one or both of the side walls. The feed apertures are grouped at a first area on the surface, the retentate apertures are grouped at a second area on the surface and the permeate apertures are located at the first and/or the second area. A plurality of permeate connector channels 14 extend inside the plate from at least one region 15,16 of the permeate channel 8, adjacent the permeate outlet ports 9,10 and these permeate connector channels provide fluidic communication between the permeate apertures and the permeate channel. The regions 15,16 can e.g. be located within two, such as within one diameter of the permeate channel from an end wall. The feed, retentate and permeate channels can suitably be straight and parallel with the surface 17. The permeate channel can further e.g. go right through the plate from one wall 21;22 to an opposite wall 21;22. The feed and retentate channels can e.g. end inside the plate with an aperture located at the end of each channel. The feed, retentate and permeate channels as well as the permeate connector channels can suitably all be located inside the plate. There will then not be any need for additional sealing surfaces along any of the channels. During use, the plate can be upstanding with the feed, retentate and permeate channels extending in a vertical direction. The plate can be manufactured from metal, such as one or more corrosion-resistant metals of high modulus, e.g. stainless steel or titanium. It can also be manufactured from plastics, such as a low leachables plastic of high modulus, e.g. PEEK. Metal plates can be used also for large distributor plates where high clamping forces are needed, while plastic plates may be limited to lower clamping force applications. Plastic plates may however be used at higher clamping pressures if they are supported by a metal plate or metal frame structure.

In some embodiments, the feed inlet port, the retentate outlet port and the permeate outlet ports are located on the end walls. The permeate outlet ports 9,10 can suitably be located on opposite end walls. An advantage of locating ports 9,10 on opposite end walls is that it facilitates draining and deaeration and it also facilitates the assembly of several plates in a stack of housings.

In certain embodiments, the permeate connector channels 14 are acutely angled towards the permeate channel 8. The angle between each permeate connector and the permeate channel can suitably be 20-80 degrees, such as 30-70 degrees. During use with an upstanding plate the acute angles facilitate draining and deaeration. The permeate connector channels can further be acutely angled with respect to the surface 17, such as with an angle of 1-30 degrees, e.g. 5-15 degrees.

In some embodiments, at least one, such as at least two of the permeate connector channels originate from each of the regions 15,16. An advantage of this is that during use with an upstanding plate, at least one or two permeate connector channels will be available for draining or deaeration—the draining occurring through the connector channel(s) near the bottom and the deaeration through the connector channel(s) near the top.

In certain embodiments, the feed apertures are aligned along a first straight line 12 and the retentate apertures are aligned along a second straight line 13. The permeate apertures 11 can be aligned with the feed and/or retentate apertures along one or both of the first or second straight line. They can also be aligned with an offset, e.g. at a distance of less than 5 mm from the first or second line.

In some embodiments, the permeate connector channels 14 each comprise two legs: an aperture leg 19 which is essentially perpendicular to the surface 17 and which ends in a permeate aperture; and a connector leg 20, which fluidically connects the aperture leg with the permeate channel 8. An advantage of this is that the two legs can be drilled from different directions, the connector leg from the permeate channel and the aperture leg from the surface. This has the effect that the apertures can be made circular as opposed to elongated in the prior art plates. An advantage of having circular apertures is that the circular shape allows higher flow rates. A further advantage is that cassettes typically have circular apertures and the alignment between two circular apertures provides a sanitary flow-path without dead-legs.

In certain embodiments, the feed channel, the retentate channel, the permeate channel and the permeate connector channels have essentially circular cross sections or are composed of segments having essentially circular cross sections. Channels with circular cross sections provide high flow rates for a given diameter and are also advantageous from a sanitation point of view. The channel segments can e.g. be either cylindrical or frustoconical.

In some embodiments, the feed channel, the retentate channel, the permeate channel and the first and second lines are essentially parallel. They can be completely parallel or they may be angled less than 20 degrees, such as less than 10 degrees, in relation to each other.

In certain embodiments, the feed apertures, the retentate apertures and the permeate apertures are all located on the surface 17. If the surface 17 is a front surface, all the apertures will then be located on the same side of the plate. Such a single-faced distributor plate is easy to manufacture and handle and is useful in many different scales of processes. Single-faced distributor plates can be used e.g. in the housing shown in FIG. 3.

In some embodiments, the surface includes a front surface 17 and a rear surface 18 which are planar and parallel and wherein the feed apertures, the retentate apertures and the permeate apertures are located on both the front 17 and the rear 18 surfaces. The distributor plate will then be double-sided, which can be advantageous particularly in large scale processes where one plate can then supply a larger number of cassettes. Double-faced distributor plates can be used e.g. in the housing shown in FIG. 4.

In certain embodiments, the plate may comprise pressure sensors. These can be mounted inside any of the channels in order to monitor e.g. the transmembrane pressure during filtration. The sensors can be wireless and may communicate with a receiver or control unit via radiofrequency signals.

Figure 3:
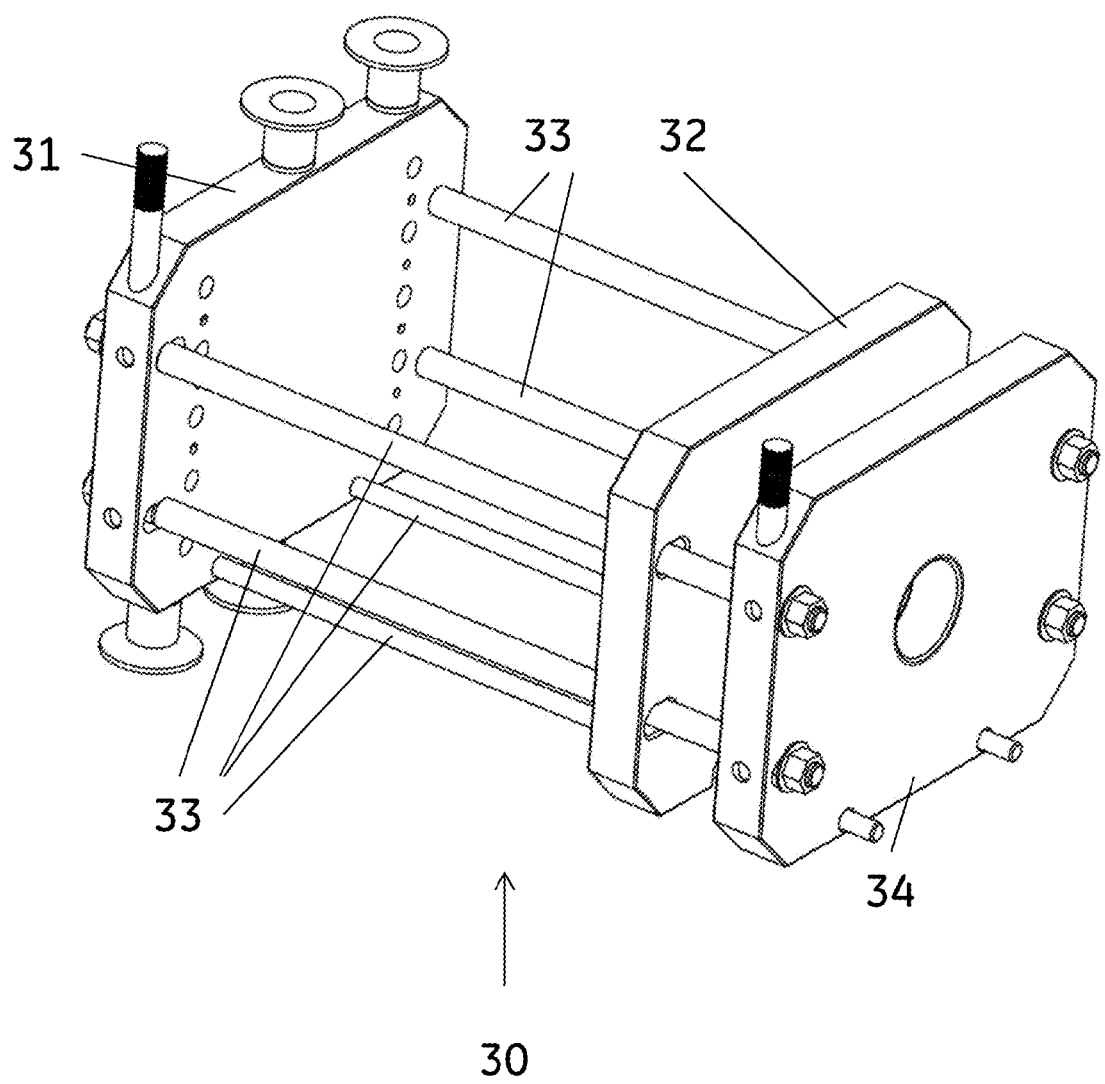
FIG. 3 shows a housing according to the invention.
Figure 4:
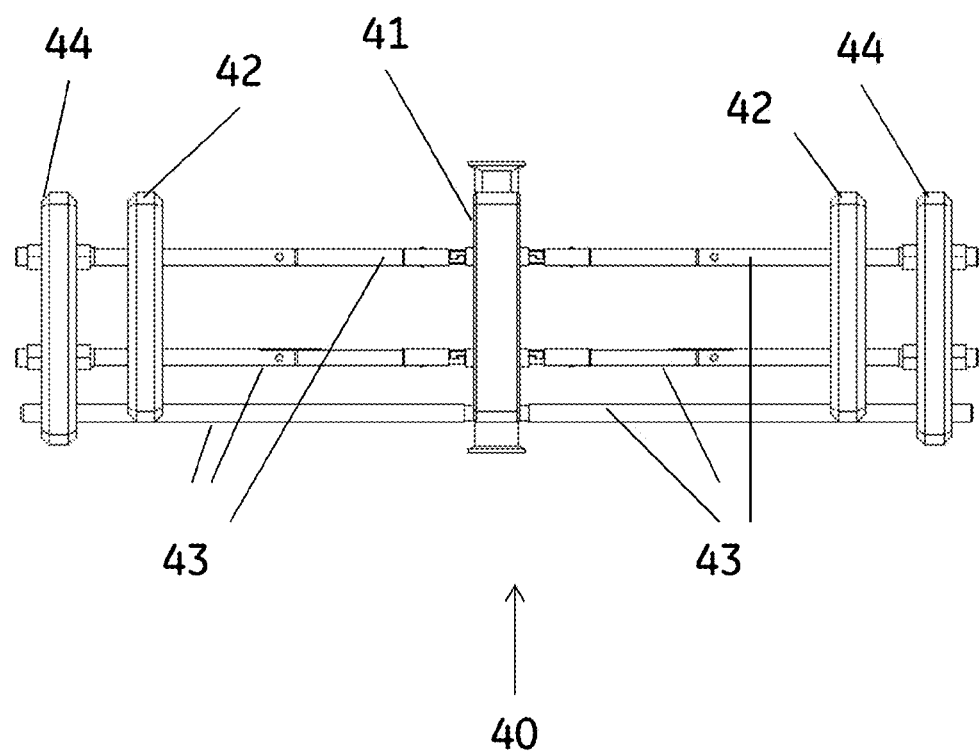
FIG. 4 shows an alternative housing according to the invention.

In a second aspect, illustrated by FIGS. 3-4, the invention discloses a housing 30;40 for crossflow filtration cassettes, comprising a distributor plate 31;41 as described in any of the above embodiments, at least one end plate 32;42 and a base frame 33;43 that is configured to permit relative movement of the distributor plate and the end plate or end plates along an axis perpendicular to the surface of the distributor plate. The base frame may e.g. comprise a plurality of rods attached to the distributor plate and to at least one support plate 34;44. The end plate can then have holes corresponding to the rods and it can slide along the rods. FIG. 3 shows a housing with one end plate and a single-faced distributor plate. FIG. 4 shows a housing with two end plates and a double-faced distributor plate.

In certain embodiments the housing further comprises at least one pneumatic or hydraulic piston affixed to the base frame to move at least one end plate towards and away from the distributor plate. The piston(s) can e.g. be attached to the support plate(s) 34;44.

In some embodiments the distributor plate is upstanding with the surface and the side walls vertically oriented. The feed, retentate and permeate channels will then extend in a vertical direction and drainage and aeration can take place through them and the angled permeate connector channels.

In certain embodiments the housing comprises at least one filtration cassette clamped between the distributor plate and an end plate. The cassette should have feed, retentate and permeate apertures in a pattern corresponding to the pattern of apertures on the distributor plate surface. The number of cassettes clamped between a distributor plate and an end plate can be from 1 to 20, such as 1 to 10 cassettes.

Figure 5:
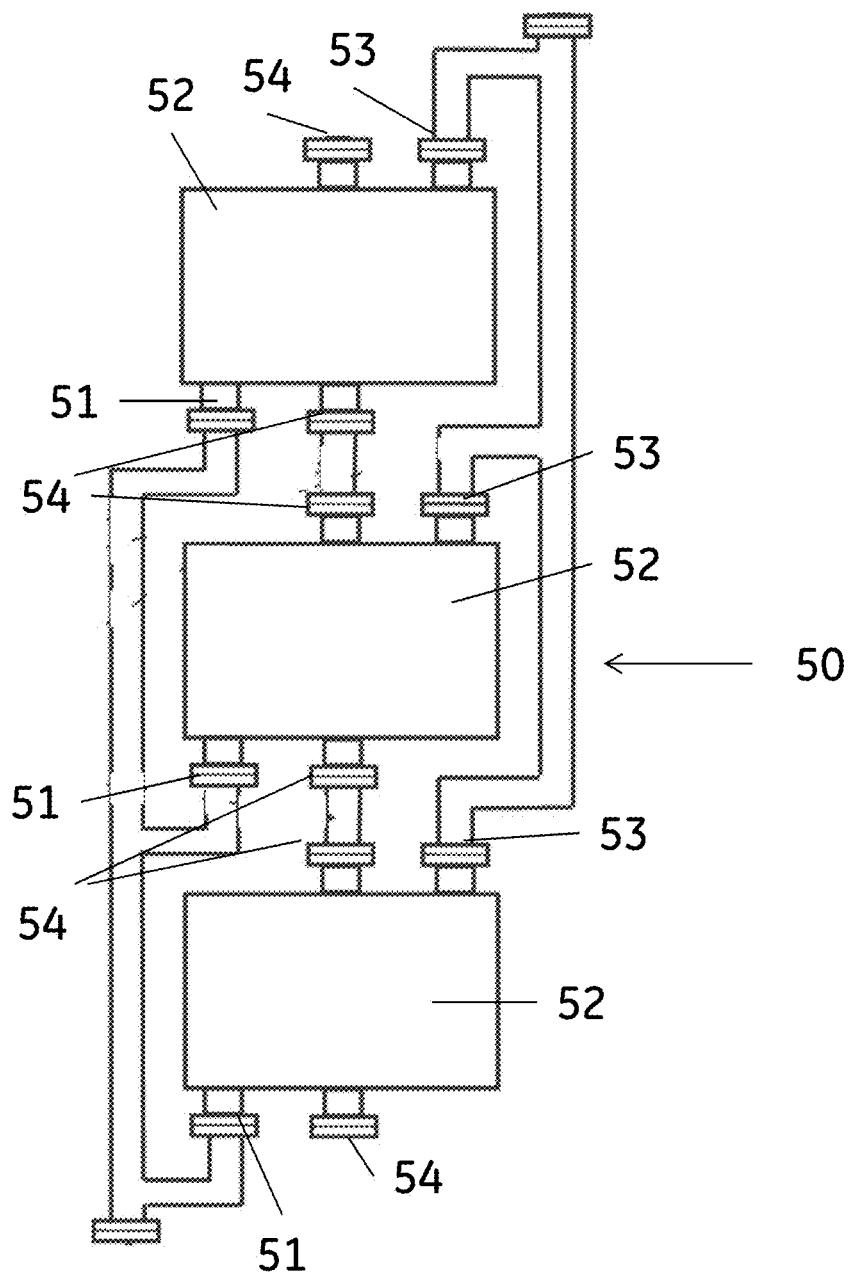
FIG. 5 shows a stack of housings according to the invention.

In a third aspect, illustrated by FIG. 5, the invention discloses a vertical stack 50 of at least two housings as described above, wherein the feed inlet ports 51 of each distributor plate 52 are fluidically connected in parallel, the retentate outlet ports 53 of each distributor plate are fluidically connected in parallel and the permeate outlet ports 54 of each distributor plate are fluidically connected in series. An advantage of the serially connected permeate outlet ports is that drainage and deaeration of the stack is facilitated. The permeate outlet ports can suitably be connected with tubing extending in a vertical direction.

In a fourth aspect, the invention discloses a method of manufacturing a distributor plate as described above. The method comprises the steps of:
a) providing a solid plate body,
b) drilling the feed, retentate and permeate channels in the solid plate body, c) drilling the permeate connector channels and the feed and retentate connector channels in the plate body. The solid plate body can be manufactured from metal, e.g. a corrosion resistant metal of high modulus, such as e.g. stainless steel or titanium. It can also be manufactured from plastics, in particular for smaller scale plates where lower clamping forces are required.

In some embodiments, the method further comprises a step d) of mounting the feed inlet port, the retentate outlet port and the permeate outlet port(s). The ports can e.g. be mounted by welding. The welding can then be performed so that no pores are formed in the flow-path. The plate can e.g. be machined to provide a tubular protrusion around each channel opening and the ports can be butt welded on the protrusions. Alternatively, the ports can be threaded and mounted using corresponding threads located in the channel openings, optionally with sealing gaskets. An alternative to mounted ports can be that the ports are shaped integrally in the plate body at the channel openings. This can be done e.g. by machining flanges directly from the plate body.

In certain embodiments, in step c) of the method, the connector legs 20 of the permeate connector channels are drilled acutely from the permeate channel in the regions 15,16 adjacent to a permeate outlet port.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. It is pointed out that any feature described in relation to one embodiment may be used also in combination with one or more features of any other of the aspects and embodiments described.

The invention claimed is:

1. A distribution plate for supplying crossflow filtration cassettes, the plate comprising a front surface and a rear surface, two opposite end walls, two opposite side walls, a feed channel in fluid communication with a feed inlet port and with a plurality of feed apertures which open into the front surface; a retentate channel in fluid communication with a retentate outlet port, and with a plurality of retentate apertures which open into the front surface; and a permeate channel in fluid communication with two permeate outlet ports located on opposite end walls and with a plurality of permeate apertures which open into the front surface;

wherein said feed channel, said retentate channel and said permeate channel extend in a direction essentially parallel with one or both side walls;

wherein the distribution plate is upstanding with said front surface, said rear surface and side walls vertically oriented;

wherein said feed apertures are aligned along a first straight line on the front surface, said retentate apertures are aligned along a second straight line on the front surface;

wherein said permeate apertures are aligned along at least one of the first and the second straight lines; and the plate further comprising a plurality of permeate connector channels, each permeate connector channel extending inside the plate from a region of the permeate channel adjacent the permeate outlet ports to one of the plurality of permeate apertures, wherein said permeate connector channels provide fluidic communication between the permeate apertures and the permeate channel.

2. The distribution plate of claim 1, wherein said feed inlet port, said retentate outlet port and said permeate outlet ports are located on the end walls.

3. The distribution plate of claim 1, wherein the permeate connector channels are acutely angled towards the permeate channel.

4. The distribution plate of claim 1, wherein said permeate connector channels each comprise two legs: an aperture leg essentially perpendicular to the front surface and ending in one of said plurality of permeate apertures, and a connector leg, connecting the aperture leg with the permeate channel.

5. The distribution plate of claim 1, wherein said permeate apertures are circular.

6. The distribution plate of claim 1, wherein said feed channel, said retentate channel, said permeate channel and said permeate connector channels have essentially circular cross sections or are composed of segments having essentially circular cross sections.

7. The distribution plate of claim 1, wherein said feed channel, said retentate channel, said permeate channel and said first and second straight lines are essentially parallel.

8. The distribution plate of claim 1, wherein said feed apertures, said retentate apertures and said permeate apertures are all located on the front surface.

9. The distribution plate of claim 1, wherein the front surface and the rear surface are planar and parallel and wherein said feed apertures, said retentate apertures and said permeate apertures are located on both the front and the rear surfaces.

10. The distribution plate of claim 1, wherein the region of the permeate channel is located within a distance of two permeate channel diameters from the end walls.

11. The distribution plate of claim 1, wherein the angle between each permeate connector channel and the permeate channel is 20-80 degrees.

* * * * *